April 29, 1947.  J. W. DAVIS  2,419,824
MATERIAL UNLOADING AND CONVEYING MECHANISM FOR TRUCKS
Filed Jan. 17, 1946  7 Sheets-Sheet 1
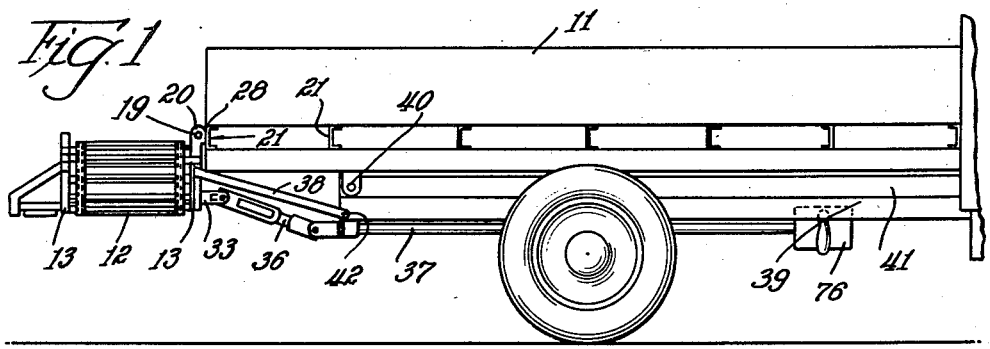
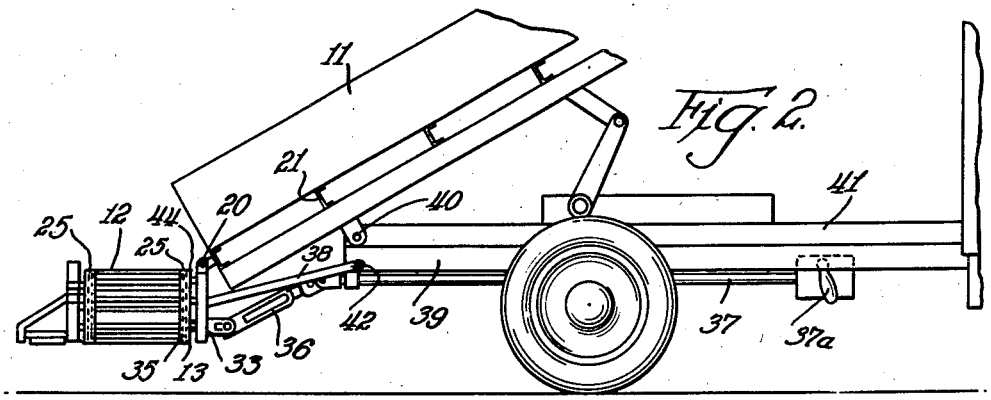
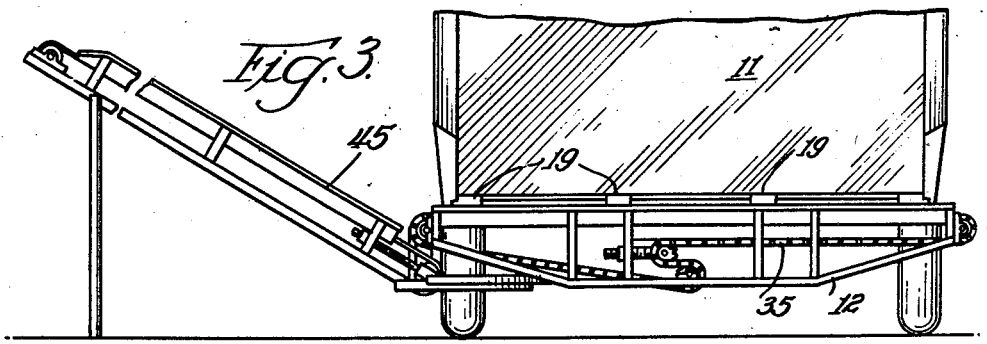
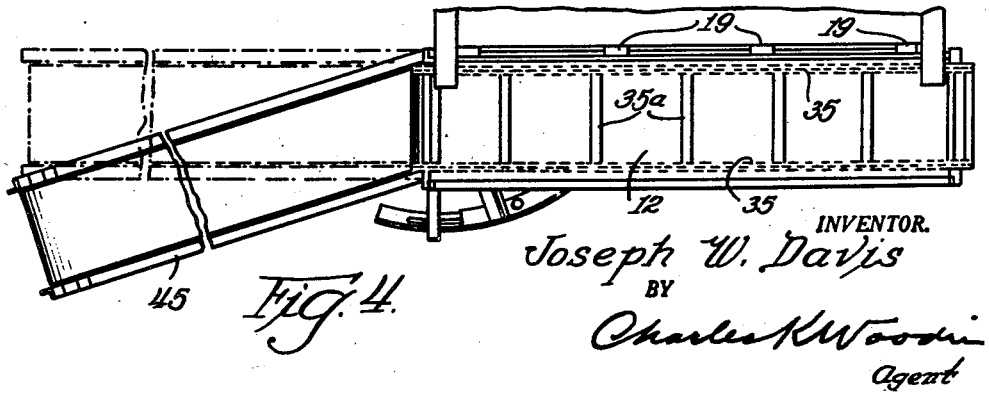
INVENTOR.
Joseph W. Davis
BY
Charles K Woodie
Agent April 29, 1947.  J. W. DAVIS  2,419,824
MATERIAL UNLOADING AND CONVEYING MECHANISM FOR TRUCKS
Filed Jan. 17, 1946  7 Sheets-Sheet 2
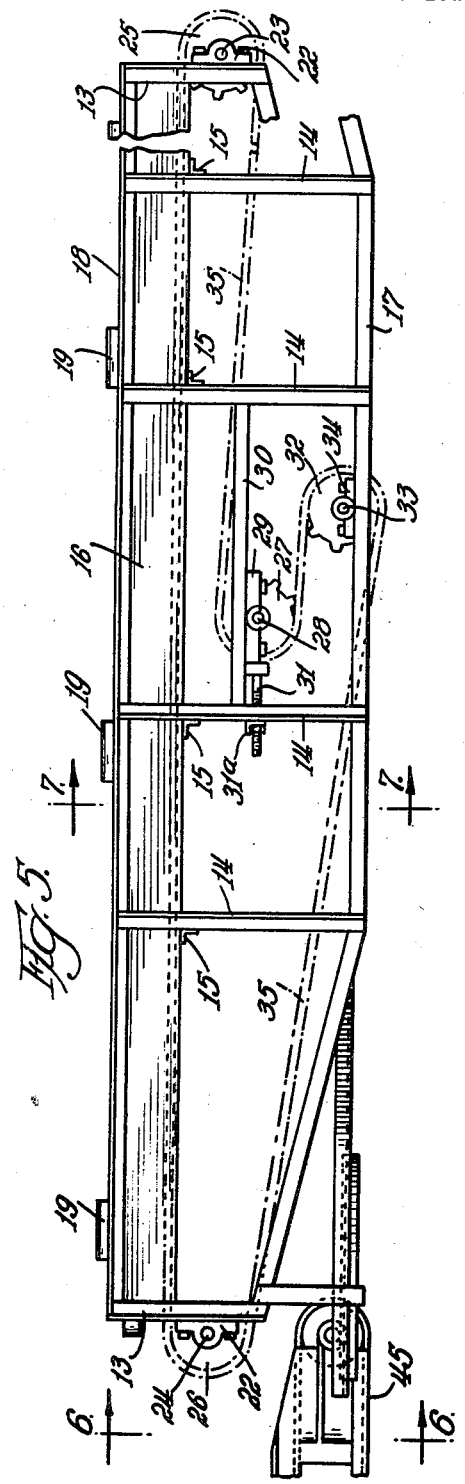
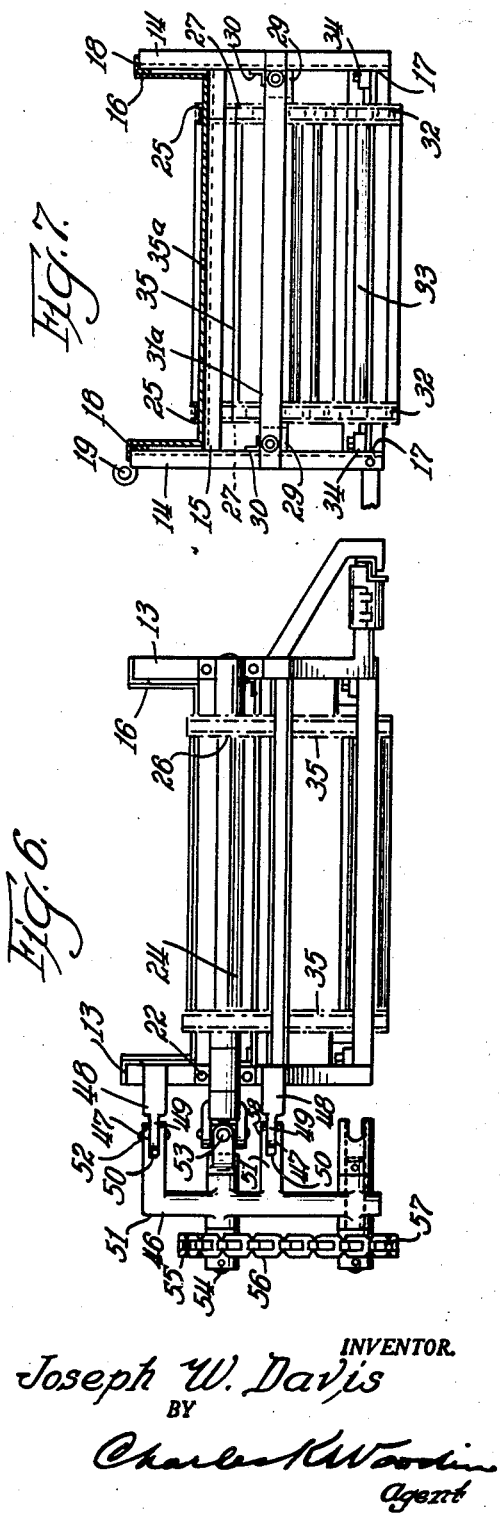
INVENTOR.
Joseph W. Davis
BY
Charles K. Woodin
Agent April 29, 1947. J. W. DAVIS 2,419,824
MATERIAL UNLOADING AND CONVEYING MECHANISM FOR TRUCKS
Filed Jan. 17, 1946 7 Sheets-Sheet 3

INVENTOR.
Joseph W. Davis
BY
Charles K. Woodin
Agent.

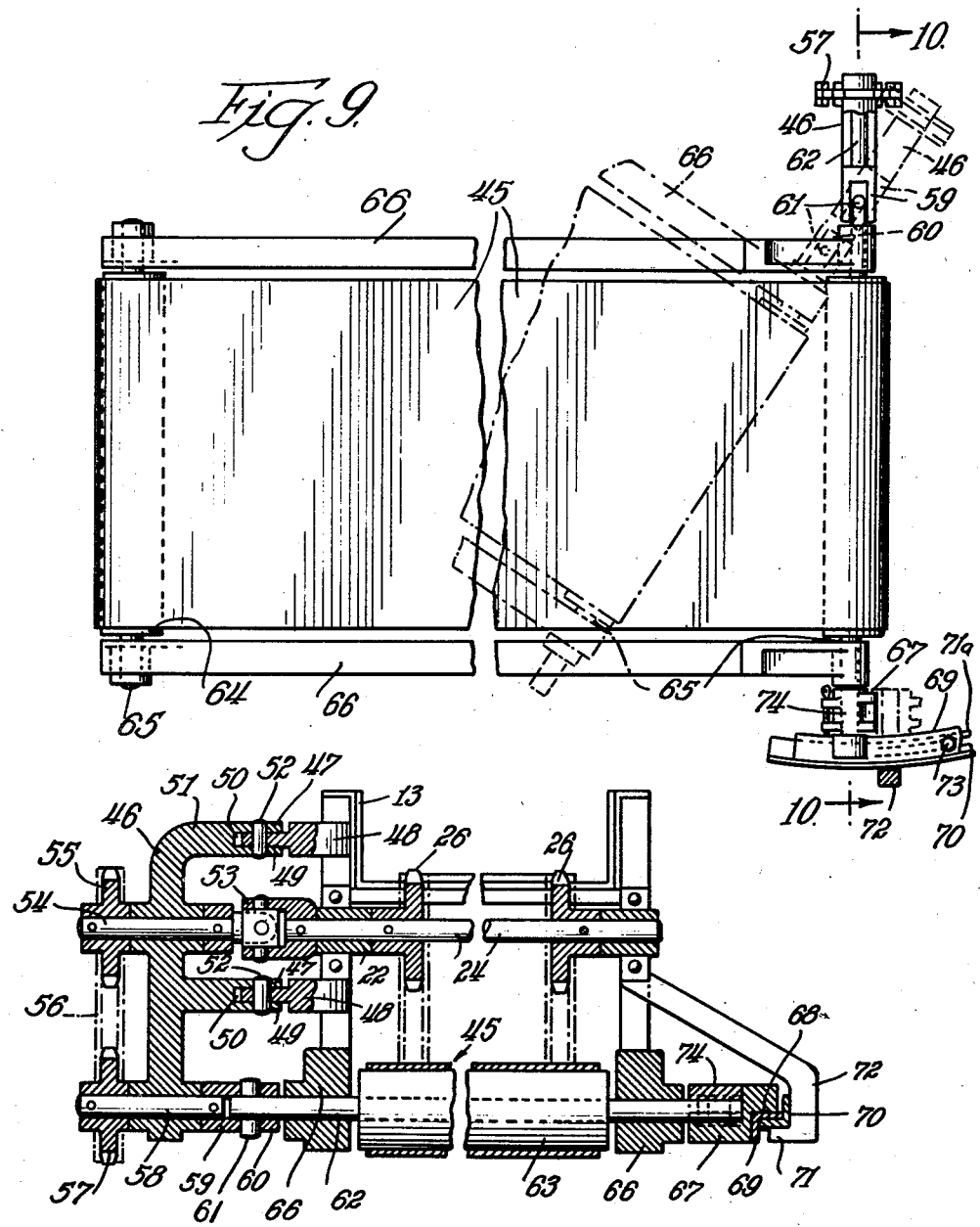

April 29, 1947.    J. W. DAVIS    2,419,824
MATERIAL UNLOADING AND CONVEYING MECHANISM FOR TRUCKS
Filed Jan. 17, 1946    7 Sheets-Sheet 5
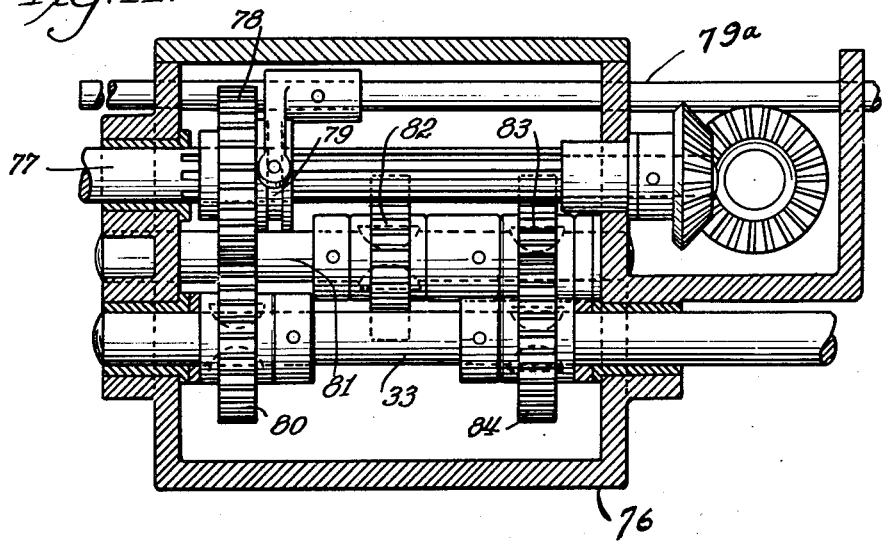
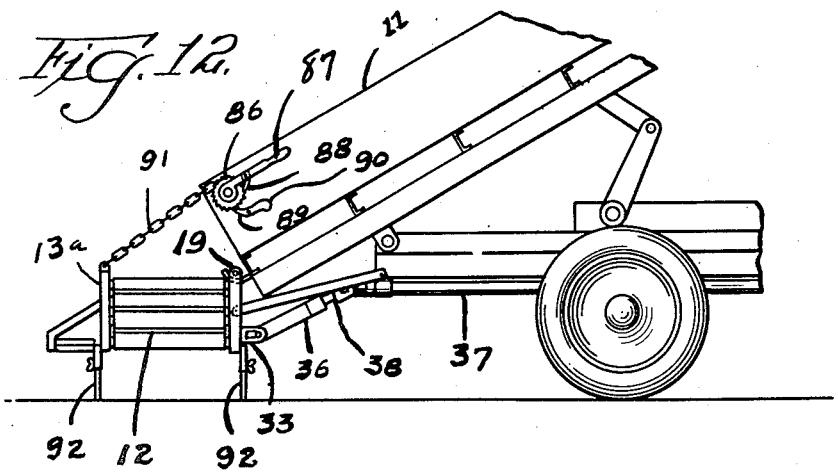
INVENTOR.
Joseph W. Davis
BY
Charles K Woodin
Agent

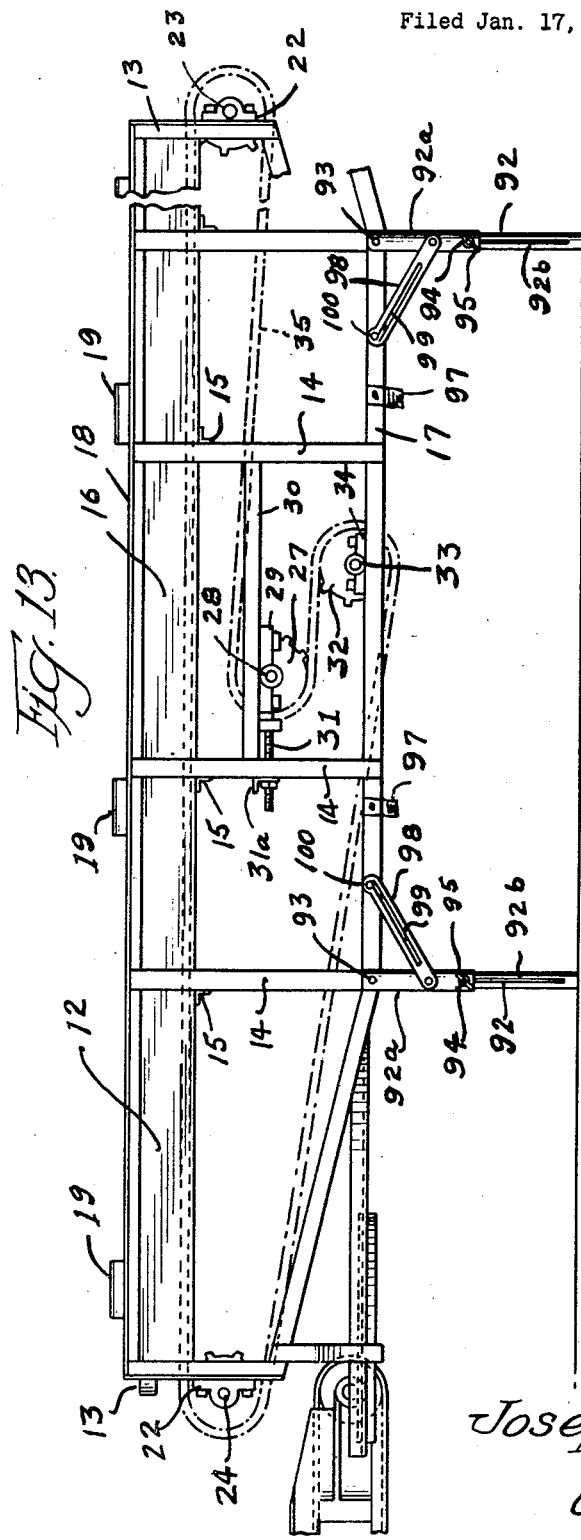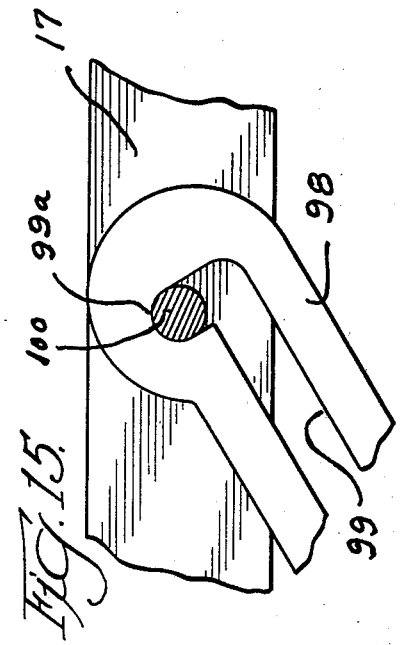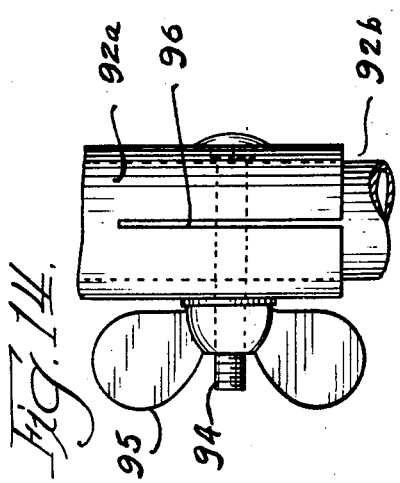

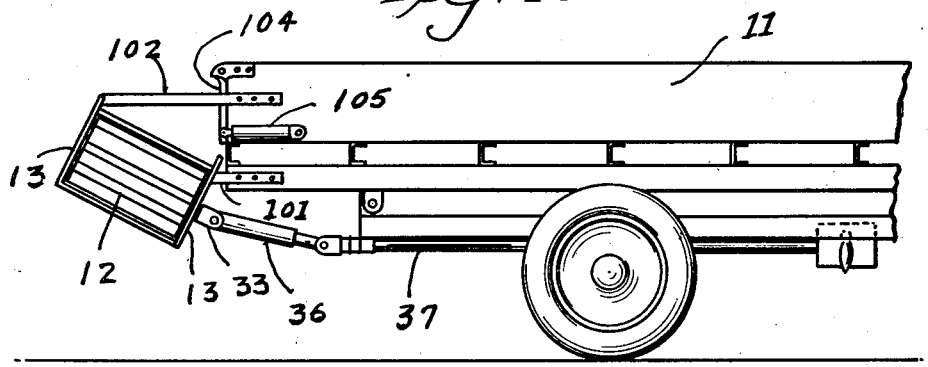
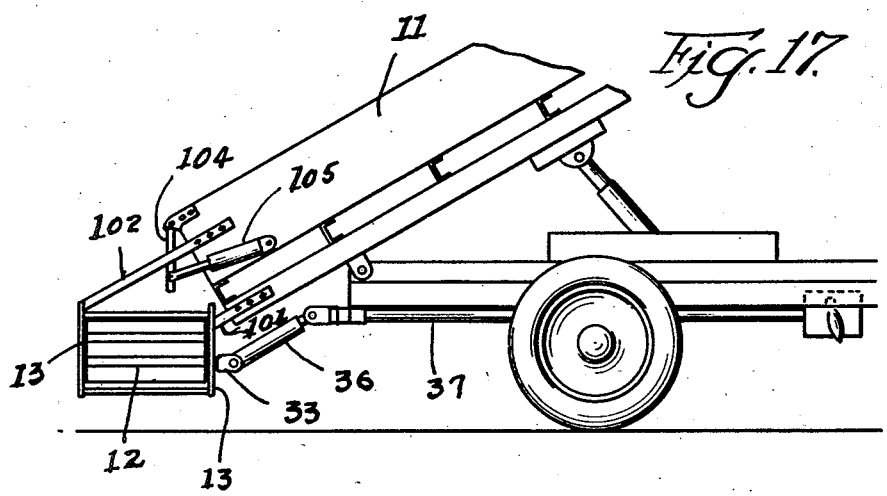

Patented Apr. 29, 1947

2,419,824

UNITED STATES PATENT OFFICE 2,419,824

MATERIAL UNLOADING AND CONVEYING MECHANISM FOR TRUCKS

Joseph W. Davis, Bloomington, Ill.

Application January 17, 1946, Serial No. 641,691

4 Claims. (Cl. 214—83)

1

This invention relates to material unloading and conveying mechanism for trucks and the like and concerns itself primarily with a conveyor supported across the rear end of the truck and which is preferably arranged so that it can be driven in either of two directions to unload upon either side of the truck through operation of the power plant, and this application constitutes a continuation, in part, of my copending application Serial No. 599,933, filed June 16, 1945.

The invention includes an auxiliary conveyor cooperating with the main conveyor and which can be swung in azimuth to deliver the material where desired and which can also be elevated for delivery purposes if necessary and which auxiliary conveyor is likewise driven by the power plant of the truck through a connection with the driving means of the main conveyor; the auxiliary conveyor being adapted for attachment to either side of the conveyor unit.

With these and other features of the invention which will be pointed out as the description proceeds, this invention comprises the novel structure and combination of parts hereinafter described and more particularly pointed out and defined in the appended claims.

In the accompanying drawings, which illustrate a preferred form of this invention and in which similar reference numerals refer to similar features in the different views:

Fig. 1 is a fragmentary side elevational view of a truck embodying a material unloading and conveying mechanism involving this invention;

Fig. 2 is a view similar to Fig. 1 but showing the truck body in tilted and unloading position;

Fig. 3 is a fragmentary rear elevational view.

Fig. 4 is a top plan view of the main conveyor at the rear end of the truck illustrating the manner in which the auxiliary conveyor can be swung in azimuth.

Fig. 5 is an enlarged side elevational view of the conveyor unit looking at the rear of the truck;

Fig. 6 is an end elevational view of the conveying unit with the auxiliary conveyor omitted looking in the direction of the arrows on the line 6—6 of Fig. 5;

Fig. 7 is a sectional view taken upon the line 7—7 of Fig. 5 looking in the direction of the arrows;

Fig. 9 is a broken top plan view of the auxiliary conveyor illustrating the manner of mounting the same;

Fig. 10 is a sectional view taken upon the line 10—10 of Fig. 9;

Fig. 11 is a sectional view taken through the reversing gear casing;

Fig. 12 is a fragmentary side elevational view illustrating a modified manner of attaching the conveyor to the truck and supporting the same;

Fig. 13 is a side elevational view of the conveyor shown in Fig. 12;

Fig. 14 is an enlarged fragmentary detail view of the conveyor supporting means shown in Fig. 13;

Fig. 15 is an enlarged fragmentary detail view illustrating a leg bracing member;

Fig. 16 is a fragmentary side elevational view of a truck illustrating a further modified manner of attaching the conveyor to the truck and showing the parts in normal position; and Fig. 17 is a view similar to Fig. 16 illustrating the truck in tilted position.

Figure 8:
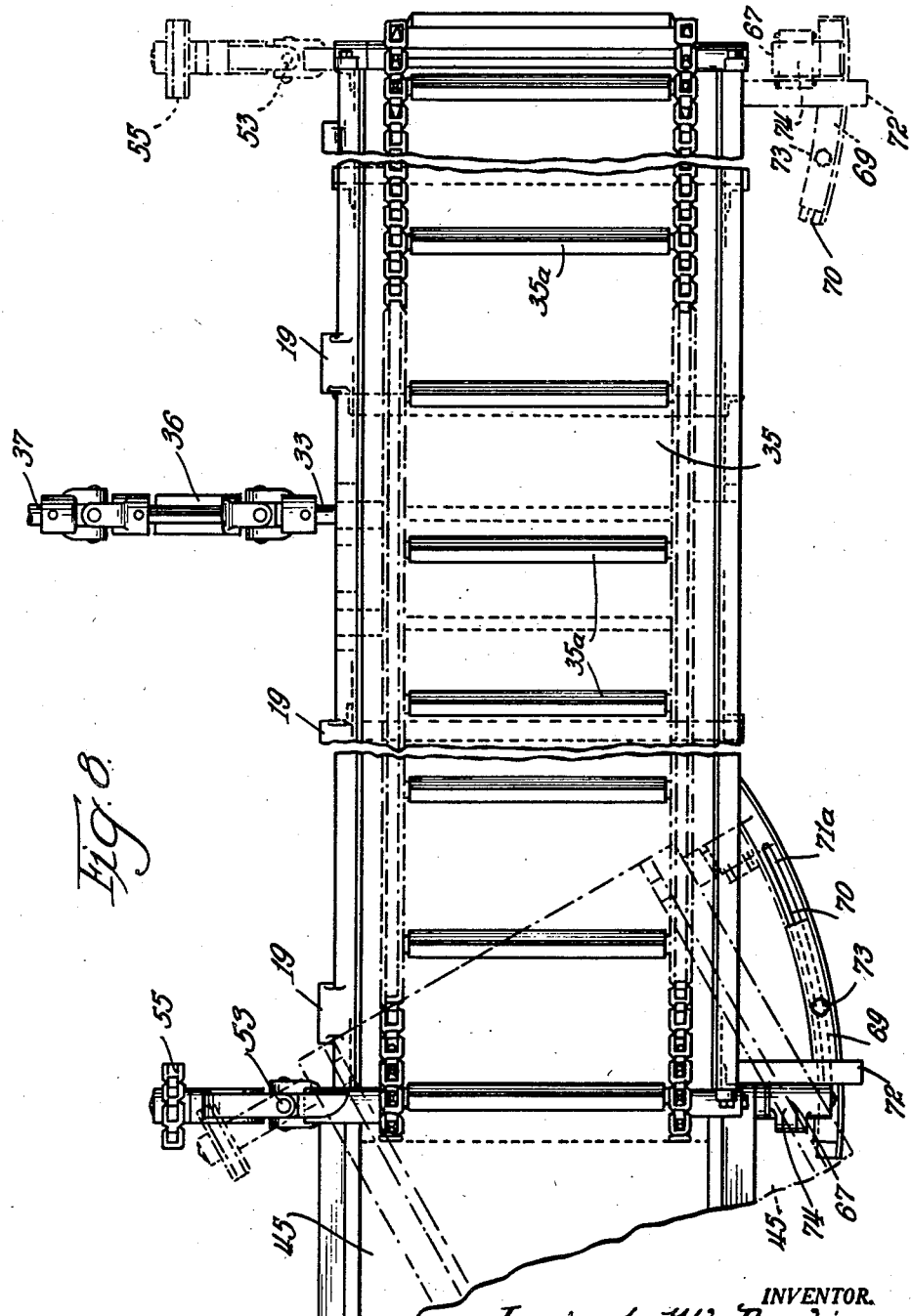
Fig. 8 is an enlarged top plan view of the main conveyor attached to the rear end of the truck illustrating the manner of attaching the auxiliary unit to either side of the main unit.

In referring now to the drawing, there is shown a truck which in the present instance is adapted for hauling coal and which has an upwardly tiltable body 11 upon the rear end of which there is secured a transversely extending conveyor unit which is generally denoted by the reference numeral 12. This conveyor unit comprises a frame having end or corner posts 13 and intermediate struts 14 which are connected by angle strips 15 (Figs. 5 and 6) which support the conveyor trough 16. Angle bars 17 which extend longitudinally of the unit are attached to the lower ends of the struts 13 and 14. The upper ends of the struts are longitudinally connected by angle bars 18 between which the conveyor trough 16 is confined. The inner angle member 18 is provided with a plurality of spaced hinged eyelets 19 which are pivotally connected to hinge brackets 20 (Figs. 1 and 2) on the rear cross sill 21 of the truck.

The end struts 13 carry shaft bearings 22 (Fig. 5) in which the head and tail shafts 23 and 24 are respectively journalled that carry the head and tail sprockets 25 and 26. Intermediate the conveyor frame, there are mounted tension idler sprockets 27 upon a shaft 28 journalled in slide bearings 29 mounted upon angle bars 30 connected to the two innermost intermediate struts 14. These slide bearings 29 are adapted to be adjusted by screw rods 31 rotatably anchored to the bearings 29 and threaded in a transverse brace angle iron 31a.

A pair of driving sprockets 32 are secured upon a shaft 33 journalled in bearings 34 secured to the members 17. A conveyor belt 35 is trained over these sprockets and is preferably provided with transverse ribs 35a as shown in Fig. 4. The driving shaft 33 is connected to a flexible shaft portion 36 (Figs. 1 and 8) which, in turn, is connected to a shaft 37 driven by a reversing transmission operated by power plant of the truck.

The main conveyor unit 13 which is hinged to the rear cross sill 21 of the truck rises and falls with the tilting of the truck. In the position shown in Fig. 1, the conveyor unit is in normal position. When the body of the truck is tilted to dumping position as shown in Fig. 2, the conveyor unit is at a lower elevation, the flexible shaft portion 36 providing for this movement. In order to maintain the conveyor unit in a true horizontal position in all positions of the truck, radius rods 38 pivotally connect the conveyor unit with the stationary frame 39 of the truck. It will be noted that the body of the truck tilts upon an axis 40 (Fig. 2) in the hoist frame 41 and the radius rod pivots on an axis 42 in the stationary frame 39 just below the pivot 40 in substantially the same vertical plane. Likewise, the hinge axis 44 of the conveyor unit is substantially in the same vertical plane as the pivotal axis 43, or the radius between the axes 40 and 42 are substantially equal, such axes define a parallelogram which will maintain the conveyor unit in a horizontal plane in all positions.

The main conveyor 35 is adapted to be driven in either direction for unloading upon either side of the truck, as will later more fully appear. The material unloaded is designed to be deposited upon the auxiliary conveyor generally denoted by the reference numeral 45 which may be attached to either end of the main conveyor frame and which may be swung in arcs of about forty-five degrees. To this end, there is secured upon each rear corner strut 13 at the ends of the conveyor frame, a swingable bracket 46 (Figs. 6 and 10) which may be swung from arcs of about forty-five degrees. While the bracket 46 may be swingingly attached to the strut 13 in various ways, as a matter of illustration, a pair of swivel joints 47 are shown. Each swivel joint consists of an arm 48 attached to a strut 13. Each arm has a tenon 49 extending into a mortise 50 in an arm 51 on the bracket 46 and pivoted therein by a pivot 52. It will be noted that the tenons and mortise joints are so arranged that the pivots 52 are in a vertical plane so that the bracket 46 can be swung in azimuth. Of course, it will be apparent that the brackets 46 may be swingably supported by other means.

The invention may embody a swingable bracket 46 with means for supporting and driving an auxiliary conveyor only upon one side of the truck. Such a construction which may be usually sufficient allows unloading only from one lateral direction of the truck. Upon certain circumstances, it may be desirable to unload in the other lateral direction of the truck. The invention contemplates provision for such circumstances by duplicating the swingable bracket 46 with its means for supporting and driving the auxiliary conveyor upon both ends of the main conveyor unit. As a result, when it is desired to unload the truck, the auxiliary conveyor can be attached to either end of the main conveyor unit for unloading from the desired side.

In Fig. 10 is shown the swingable bracket construction for each end of the conveyor unit, but it will be described in connection with the tail sprocket shaft 24; the head sprocket shaft 23 being similar if the swingable bracket 46 is used at each end of the conveyor unit. It will be noted that the conveyor shaft 24 extends through its bearings 22 and that it has a suitable universal joint connection 53 with a stub shaft 54 journalled in the bracket 46. The shaft carries a sprocket wheel 55 which is geared by a sprocket chain 56 to sprocket wheel 57 secured upon a shaft 58 journalled in the lower end of the bracket and extending inwardly with a bearing member 59 secured upon its inner end portion. The bearing 59 has a bifurcation 60 in its free end for receiving a cross pin 61 on the shaft 62 of the head roller 63 of the auxiliary conveyor 45. The auxiliary conveyor comprises a head roller 63 mounted upon shaft 62 and a tail roller 64 mounted upon a shaft 65. The shafts 62 and 65 are supported by parallel side frame members 66. The free end of the head shaft 62 extends through the frame member 66 and carries at its end a lock barrel 67 provided with a rabbet 68 in which an angle member 69 is seated which is adapted to slide over an angle member 70 seated upon a lip 71 on an angular bracket 72 attached to the end strut 13. The angle member 70 which is of arcuate form and attached at its inner end to the frame of the main conveyor, as shown in Fig. 8, is provided with a slot 71a for receiving a bolt 73 that slidably clamps the angle members 69 and 70 together. The barrel 67 is provided with a hinge cover 74 which can be snapped and retained over the end portion of shaft 62 which extends into the barrel a little short of the rabbet 68.

Thus, the auxiliary conveyor can readily be attached to the conveyor frame or removed therefrom. Likewise, it can be attached to either end of the main conveyor frame. In Fig. 9, the manner of detaching the auxiliary conveyor is shown in dotted lines. It is merely necessary to unclamp the barrel cover 74, lift the shaft 62 therefrom and disengage the pin 61 from the bifurcation 60 which may be done by a swinging movement as indicated in dotted lines in Fig. 9. A reverse operation will attach the auxiliary conveyor to the main conveyor frame.

When the auxiliary conveyor is in place, it can be swung through an angle of about 45 degrees, as shown in Fig. 8, by loosening the nut 73 and swinging the bracket 46; the barrel 67 sliding over the arcuate support 70.

When the auxiliary conveyor is mounted upon the left-hand end of the main conveyor frame, it is adapted to be driven through normal operation of the power plant, but when the auxiliary conveyor is mounted upon the right-hand end of the main conveyor, it is necessary to employ reversing gears such as shown in Fig. 11. In Fig. 11, there is shown a transmission casing 76 which is adapted to be carried by the truck. The motor shaft 77 is journalled in this casing and carries a slidable gear 78 having a gear shift lever yoke 79 on a shift rod 79a. The gear 78 meshes with a gear 80 keyed upon the conveyor driving shaft 33 for rotating the same in one direction.

To rotate shaft 33 in the other direction, there is provided a third shaft 81 having a gear 82 thereon which is adapted to be engaged by gear 78 when the latter is shifted sufficiently to the right. Shafts 81 and 33 are geared together by gears 83 and 84 respectively secured thereto. As a result, when shaft 81 drives shaft 33 the latter will have a reversed rotation.

In Figs. 12 to 15, there is shown a modified form of a part of the invention. In this form, the main conveyor unit is driven from shaft 37 through the flexible connection 36 as in the first form and is pivotally connected with the truck frame by the hinge eyelets 19 and the radius rod 38 as in the first form. In addition, for more positively controlling the relation of the main conveyor and truck there is provided in the side of the truck a suitable winch 86 having an operating handle 87 which carries a pawl 88 that engages a ratchet wheel 89 for rotating the drum of the winch. A holding pawl 90 holds the ratchet wheel against reverse rotation. A chain 91 fastened at one end to the drum of the winch is attached at its other end to the outer post 13a of the conveyor unit. By operating the winch, the main conveyor can be swung on its hinge connection with the truck to bring the same to a horizontal position when the truck body is tilted to unloading position as shown in Fig. 12. However, the winch can be operated to tilt the conveyor to an angular position with relation to the truck body so that when the body is tilted to unloading position the conveyor will occupy a horizontal position obtaining the same result as is obtained by the structure shown in Figs. 16 and 17.

In order to more firmly support this main conveyor when in use, it is provided with adjustable legs 92. Each leg consists of a tubular socket 92a pivoted at 93 to the lower frame member 17 of the conveyor and a slotted rod 92b which adjustably extends into the socket and is clamped therein by a bolt 94 having a wing nut 95. In order to provide a clamping action between the tube 92a and the rod 92b, the lower portion of the socket is slotted as indicated at 9b in Fig. 14. Thus, by loosening the wing nut the two parts of each leg can be relatively adjusted to provide the desired length of leg for supporting the conveyor in a horizontal plane.

When the conveyor is not in use or when the truck is traveling, the legs 92 are adapted to be folded upwardly into parallel relation with the frame member 17 of the conveyor and confined by a spring clamp or catch 97 of suitable construction. To this end, each leg is pivotally connected by a brace 98 with the conveyor frame. Each brace has a slot 99 with an offset notch 99a clearly shown in Fig. 15. Pins or studs 100 on the frame member 17 extend in the slots of the braces. It will be noted that the offset notches 99a extend in an upward direction and receive the studs 100 when the same are in extended form as shown in Figs. 13 and 15. The braces 98 may be lifted to disengage the notches 99a from the pins allowing the legs to be swung upwardly on their pivots 93 and folded against the conveyor frame so as to spring within the spring clamps 97; the studs 100 sliding in the slots during such movement as is obvious.

Instead of using a chain and winch to tilt the conveyor, the conveyor may be attached to the truck body at the proper inclination, as shown in Figs. 16 and 17, in which the main conveyor is rigidly attached to the body of the truck in an inclined position so that it will assume a horizontal position when the truck body is tilted to unloading position as shown in Fig. 17. In this form, the shaft 33 of the conveyor is connected by a flexible link 36 to the shaft 37 as in the first form, but the conveyor is rigidly attached to the body of the truck by suitable supports 101 and 102. The supports upon one side of the truck only are shown. They are adapted to be duplicated upon the other side of the truck.

It will be noted that the support 101 connects the near side of the conveyor with a frame member of the truck in a manner somewhat similar to the radius rod 38 and the support 102 connects the body of the truck with the far side of the conveyor and serves a function similar to that of the chain 91 shown in Fig. 12. It will be further noted that the conveyor 12 is transversely inclined with respect to the horizontal plane of the truck body that when the truck body is tilted to unloading position, the conveyor will be in a horizontal plane.

In the use of this last described modification, it may be desirable to have the discharge from the rear end of the truck controlled and to this end there is shown a hinge door 104 upon the rear of the body of the truck to which an adjustably telescopic control 105 is pivoted. This control 105 is also pivoted to the body of the truck and is adapted for movement from the position shown in Fig. 16 to the position shown in Fig. 17 for frictionally holding the door open.

It will be appreciated that according to this invention, the main conveyor is permanently attached to the truck and is driven by the power plant of the truck and no special motor is required. The auxiliary conveyor is, however, adapted to be attached at the unloading location of the truck and as it is driven from the main conveyor, no special motor is needed therefor. Within the scope of this invention, it is also possible to unload the truck from either side by attaching the auxiliary conveyor to the desired end of the main conveyor and reversing the main conveyor drive if necessary, as previously explained.

This invention will obviously expedite the unloading of material such as coal from a truck and save considerable time and expense. At the same time, the material can be more approximately deposited where it is desired through the use of suitable auxiliary conveyors.

I am aware that many changes may be made and various details of construction varied without departing from the principles of this invention so I do not propose limiting the patent granted thereon otherwise than necessitated by the appended claims.

I claim as my invention:

1. In a material hauling truck having a tiltable body, an unloading conveyor extending transversely of the rear of the body and spaced connections between said conveyor and truck adapted to maintain said conveyor at an inclination to said body when the same is in normal position and in horizontal position when said body is tilted to unloading position.

2. In a material hauling truck, having a tiltable body, an unloading conveyor extending transversely of the rear of the body, a permanent connection between one side of said conveyor and said truck, a permanent connection between the other side of said conveyor and truck, said connections being adapted for maintaining said conveyor in a transversely inclined position when said body is in normal position and in horizontal position when said body is tilted to unloading position.

3. In a material hauling truck having a tiltable body, an unloading conveyor extending transversely of the rear of said truck, a permanent connection between the inner side of said conveyor and said truck and a rigid connection between the other side of said conveyor and said truck, said connections serving to maintain said conveyor in a transversely inclined position when said body is in normal position and in horizontal position when said body is tilted to unloading position.

4. In a material hauling truck having a tiltable body, an unloading conveyor extending transversely of the rear of said truck, means for connecting said conveyor to said truck whereby said conveyor will have an oblique position when said body is in normal position and a horizontal position when said body is tilted to unloading position, said means comprising a rigid bracket connecting one side of said conveyor and truck and a second bracket connecting the other side of said conveyor and truck.

JOSEPH W. DAVIS.

REFERENCES CITED

The following references are of record in the file of this patent:

UNITED STATES PATENTS

| Number | Name | Date |
|---|---|---|
| 2,102,432 | Nesseth | Dec. 14, 1937 |
| 676,212 | Vansant | June 11, 1901 |
| 2,304,249 | Erickson | Dec. 8, 1942 |
| 2,293,486 | Barrett | Aug. 18, 1942 |